(12) United States Patent
Tamaki et al.

(10) Patent No.: US 7,614,772 B2
(45) Date of Patent: Nov. 10, 2009

(54) LINEAR LIGHT EMITTING APPARATUS

(75) Inventors: Makoto Tamaki, Aichi (JP); Tadaoki Ichikawa, Aichi (JP); Yukiko Marui, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 152 days.

(21) Appl. No.: 11/802,920

(22) Filed: May 25, 2007

(65) Prior Publication Data

US 2008/0002421 A1    Jan. 3, 2008

(30) Foreign Application Priority Data

May 26, 2006  (JP)  ............................. P2006-146037
Jul. 11, 2006  (JP)  ............................. P2006-190748

(51) Int. Cl.
*F21V 7/04*    (2006.01)

(52) U.S. Cl. .................. 362/551; 362/623; 362/620

(58) Field of Classification Search ................ 362/551, 362/552, 555, 526, 487, 620, 623
See application file for complete search history.

(56) References Cited

U.S. PATENT DOCUMENTS 5,590,945 A * 1/1997 Simms ..................... 362/623
6,786,626 B2 * 9/2004 Wu et al. ..................... 362/555
6,971,782 B2 * 12/2005 Nagakubo et al. ........... 362/625
7,140,762 B2 * 11/2006 Wu et al. ..................... 362/610

FOREIGN PATENT DOCUMENTS

| JP | 2900799 | 3/1999 |
| JP | 2005-114894 | 4/2005 |
| JP | 2005-300852 | 10/2005 |

* cited by examiner

*Primary Examiner*—Ali Alavi
(74) *Attorney, Agent, or Firm*—McGinn IP Law Group, PLLC

(57) ABSTRACT

The linear light emitting apparatus includes: a light source; and, a linear light guide member into which the light of the light source is guided from one end side thereof, and also which includes a projecting portion extending continuously along the longitudinal axis of the linear light guide member. In the upper surface of the projecting portion, there are formed light expanding and reflecting portions each extending over the entire width of the upper surface at given intervals.

23 Claims, 14 Drawing Sheets

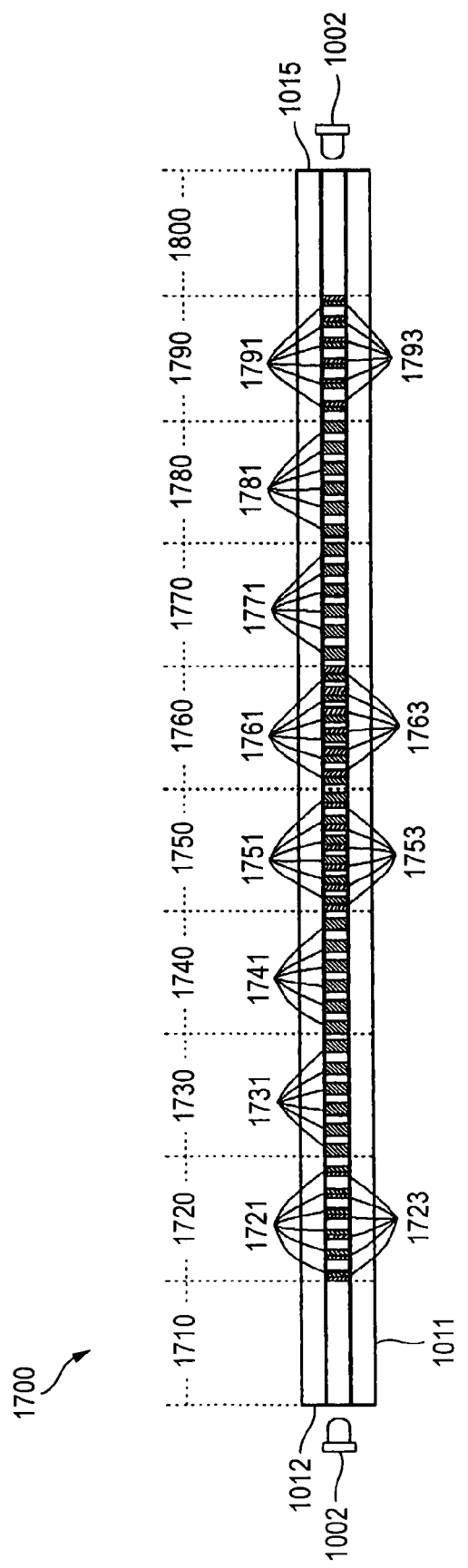

a# LINEAR LIGHT EMITTING APPARATUS

BACKGROUND OF THE INVENTION

1. Field of the Invention

The present invention relates to a linear light emitting apparatus. Specifically, the invention relates to an improvement in a light emitting apparatus which converts the light of a light source to linear light using a light guide member and then emits the linear light.

2. Description of the Related Art

Conventionally, a linear light emitting apparatus using a linear light guide member has been used for lighting and the like. When light is guided into the linear light guide member, normally, the amount of the light arriving in the portion of the linear light guide member distant from a light source is reduced when compared with the amount of the light in the portion of the linear light guide member existing in the vicinity of the light source. This gives rise to the uneven amount of the light, with the result that the light provides uneven light. To solve this problem, there have been conducted various studies. For example, in Japanese Patent No. 2900799, there is disclosed a lighting apparatus in which light is guided in from the end face of a linear light guide member, the light is reflected by the reflecting surface of the upper surface of the linear light guide member, and the resultant linear light is then emitted from the lower surface of the linear light guide member. According to this lighting apparatus, on the upper surface reflecting surface of the linear light guide member, there are disposed at given intervals light expanding and reflecting portions each having a uniform shape, or there are disposed at given intervals light expanding and reflecting portions in such a manner that they broaden gradually as they part away from a light source, thereby enhancing the light reflecting and expanding effect of the lighting apparatus. Further, to compensate the reduction of the amount of light arriving in the portion of the linear light guide member existing distant from the light source, the linear light guide member is narrowed as it parts away from the light source. As other conventional technologies, there are known the linear light emitting apparatus that are disclosed in JP-A-2005-114894 and JP-A-2005-300852.

In the conventional linear light emitting apparatus, by enhancing the light expanding and reflecting action in an area distant from the light source, a light take-out efficiency in the area distant from the light source is enhanced to thereby reduce the uneven amount of the light emitted. However, when compared with the area near to the light source, in the area distant from the light source, the amount of the light reaching there is itself small. Therefore, in some cases, simply by enhancing the light expanding and reflecting action in the area distant from the light source, the reduction of the uneven light emission amount cannot be attained sufficiently. The longer the linear light guide member is, the greater this tendency is. On the other hand, when the light expanding and reflecting portions are widened as they part away from the light source, or when the linear light guide member is narrowed as it becomes distant from the light source, the width of the linear light is varied accordingly. That is, it is impossible to obtain the linear light that has a uniform width.

SUMMARY OF THE INVENTION

Thus, it is an object of the invention to provide a linear light emitting apparatus which can solve the above-mentioned problems and can emit linear light having a uniform width. And, it is another object of the invention to provide a linear light emitting apparatus which not only can be manufactured with high precision and at a high yield rate but also can emit linear light having a uniform width.

In attaining at least one of the above objects, according to the invention, there is provided the following linear light emitting apparatus: that is, A linear light emitting apparatus which comprises: a light source; and, a linear light guide member to which the light of the light source is guided from one end side thereof, and also which includes a projecting portion extending along the longitudinal axis thereof as well as light expanding and reflecting portions respectively formed on the projecting portion at given intervals, each of the light expanding and reflecting portions extending over the entire width of the upper surface of the projecting portion.

In the linear light emitting apparatus according to the invention, firstly, the light of the light source is guided into the linear light guide member. The thus guided light is reflected by the upper surface of the projecting portion of the linear light guide member. In the upper surface of the projecting portion, there are disposed light expanding and reflecting portions at given intervals, while each of them extends over the entire width of the upper surface of the projecting portion. This structure makes it possible to emit the light having a uniform width from the opposite side of the projecting portion. Since the light expanding and reflecting portions are formed so as to extend over the entire width of the upper surface of the projecting portion, the ends (edges) of the light expanding and reflecting portions in the width direction thereof coincide with the end of the upper surface of the projecting portion. According to this, the edges of the light expanding and reflecting portions can be distinguished clearly. As a result of this, the edge of the emitted light can also be distinguished clearly.

BRIEF DESCRIPTION OF THE DRAWINGS

FIG. 14 is a view of the upper surface of a linear light guide member 1011 used in a linear light emitting apparatus 1600 according to a sixth embodiment of the invention.

DESCRIPTION OF THE PREFERRED EMBODIMENTS

Figure 1:
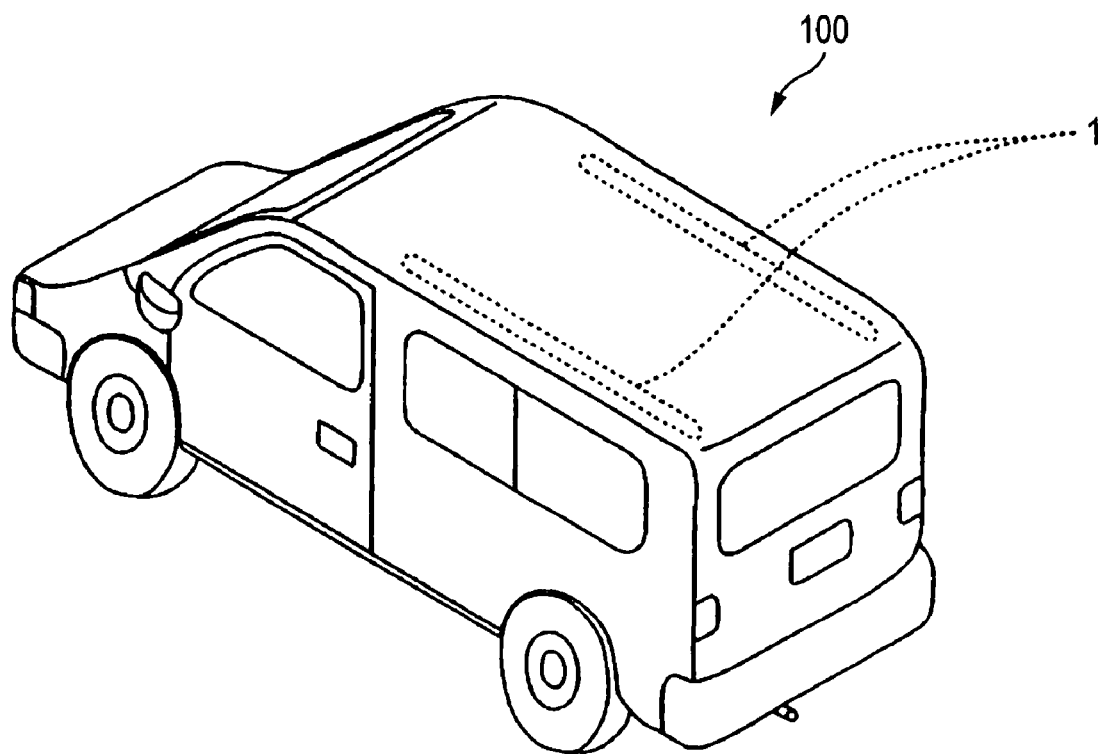
FIG. 1 is a perspective view of a vehicle 100 which uses a linear light emitting apparatus 1 according to a first embodiment of the invention.

Now, description will be given below in detail of composing elements used in first to third embodiments of a linear light emitting apparatus according to the invention.

(Light Source)

The light source is not limited to a specific type but, preferably, there may be used an LED lamp, because the LED lamp has advantages in that it is compact and is strong against vibrations and shocks. The LED lamp is not limited to any specific type but there can be used various types such as a lamp type and an SMD type. Most preferably, there may be used a lamp-type LED lamp. Since the light of the lamp-type LED lamp is high in directivity, the lamp-type LED lamp can guide the light to a linear light guide member (which will be discussed later) more efficiently than other LED lamps. The light emitting color of the LED lamp is not limited to any specific color but it is possible to use any desired one of LED lamps for a white color, a blue color, a red color, a green color and the like. It is also possible to use two or more LED lamps as the light source.

(Linear Light Guide Member)

As the materials of the linear light guide member, there can be used synthetic resin such as acrylic resin, polycarbonate resin, polyethylene terephthalate resin (PET), silicone resin and epoxy resin, as well as light transmissible material such as inorganic material including glass. And, these materials may be combined together to provide a linear light guide member. Most preferably, there may be used the acrylic resin. The acrylic resin provides a small light expansion action and thus can provide a high light guide action. Also, from the viewpoint of securing sufficient strength and shock resistance, preferably, there may be used the polycarbonate resin.

The linear light guide member is disposed in such a manner that the light of the light source is allowed to enter it from the end face thereof. For example, the longitudinal section of the linear light guide member may provide a substantially circular shape, a substantially elliptical shape, a triangular shape, a square shape, a pentagonal shape, a hexagonal shape, or a shape which can be obtained when these shapes are combined together properly.

The linear light guide member includes a projecting portion which extends continuously along the longitudinal axis thereof. The projecting portion is composed of side surfaces and an upper surface. Preferably, the boundary between the side surface and upper surface of the projecting portion may be linear. The reason for this is that the edge of the light reflected by the upper surface of the projecting portion provides a straight line and thus the light can be distinguished clearly as a linear light. The projecting portion, preferably, may be formed such that it has the same width over the whole thereof, while the section of the light emitting surface of the linear light guide member may be composed of a substantially-circular curved surface. That is, the upper surface of the projecting portion may preferably be rectangular when the projecting portion is viewed from above. Referring to the above description that the width of the projecting portion is set uniform, since the width of the light expanding and reflecting portion is also coincident with the width of the projecting portion, the light expanding and reflecting portion having the same width can be easily formed with high precision. The upper surface of the projecting portion may be a plane or a curved surface.

The size of the linear light guide member and the size of the projecting portion can be decided with the size of a target illumination area taken into consideration. For example, the linear light guide member may be formed as a cylindrical body having a diameter of 8 mm and a length of 1 m, and the projecting portion may be formed such that the upper surface thereof has a uniform width of 2 mm. The linear light guide member can be formed according to a well-known method such as a molding operation (for example, an extrusion molding operation and an injection molding operation).

On the upper surface of the projecting portion, there are formed light expanding and reflecting portions. The light expanding and reflecting portions can be formed by applying or printing an expanding and reflecting paint, or by enforcing a light expansion and reflection processing such as a drawing operation, or by bonding a light expansion and reflection tape. When the light expanding and reflecting portion is formed by printing, there can be used an acrylic system paint, an epoxy system paint, a urethane system paint or the like. Each light expanding and reflecting portion is formed such that it extends over the entire width of the upper surface of the projecting portion. That is, each light expanding and reflecting portion is formed in such a manner that it extends continuously from one of the two sides of the upper surface of the projecting portion to the other both of which are parallel to the longitudinal axis of the projecting portion. The light expanding and reflecting portions are formed at given intervals in the longitudinal axis direction of the projection portion. For example, the light expanding and reflecting portions are respectively formed such that the more distant the light expanding and reflecting portions are, the higher the densities thereof are. By the way, the term "density" used here means the ratio of an area, where the light expanding and reflecting portion exists, to the unit area of the upper surface of the projecting portion. For example, when forming two or more light expanding and reflecting portions having the same length, the distance between two mutually adjoining light expanding and reflecting portions may be narrowed as they part away from the light source. In this case, as the light expanding and reflecting portions become distant from the light source, the densities thereof increase. The distance between the two mutually adjoining light expanding and reflecting portions may be varied continuously or step by step. The distance between the two mutually adjoining light expanding and reflecting portions is not limited to a specific distance, but it can be set, for example, about 0.5~10 mm. Also, the lengths of the light expanding and reflecting portions (the widths of thereof in the longitudinal axis direction of the linear light guide member) may be varied continuously or step by step. When the light expanding and reflecting portions are formed according to the drawing operation, the drawing densities of the light expanding and reflecting portions to be formed in the area of the upper surface of the projecting portion distant from the light source may be set high to thereby enhance the light expansion and reflection property of the light expanding and reflecting portions. In this case, a light expansion and reflection action in the area distant from the light source, where the amount of the light tends to be short, can be enhanced to thereby contribute for reducing the uneven amount of the light emitted.

According to the first embodiment of the invention, on the upper surface of the projecting portion, there is formed a main expanding and reflecting area. The main expanding and reflecting area is an area which is, of the upper surface of the projecting portion, includes a central area in the longitudinal axis direction of the projecting portion and also which occupies most of the upper surface of the projecting portion. In the main expanding and reflecting area, preferably, the light expanding and reflecting portions may be respectively formed such that the longer the distances thereof from the light source are, the higher the densities thereof are. This arrangement can enhance a light expansion and reflection action in the portion of the main expanding and reflecting area distant from the light source, thereby being able to reduce the luminance difference between the portion of the main expanding and reflecting area near to the light source and the portion thereof distant from the light source. In such end portion of the upper surface of the projecting portion that does not belong to the main expanding and reflecting area but exists near to the light source side, preferably, there may not be formed any light expanding and reflecting portion. Since the amount of light is large in such near-to-light-source end portion, when a light expanding and reflection portion is formed in such near-to-light-source end portion, an excessive amount of light is emitted there, which leads to the uneven amount of light emitted. When a light expanding and reflection portion is not formed in the near-to-light-source end portion, the light of the end portion area on the near-to-light-source side can be used as the light of the portion of the upper surface of the projecting portion distant from the light source, thereby being able to prevent the occurrence of the uneven amount of the light emitted.

In the linear light guide member, preferably, there may be provided a light reflecting layer on the end face thereof distant from the light source (the end face on the opposite side to an end face to which the light is guided). According to provision of such light reflecting layer, the light having arrived at the present end face can be reflected into the linear light guide member and thus can be used as the linear light of the linear light guide member. This can enhance the utilization rate of the light. The light reflecting layer can be formed by painting or printing an expansion and reflection material, or by enforcing a light expanding and reflecting processing such as a drawing operation, or by bonding a light expansion and reflection tape. When the light reflecting layer is disposed on such end face distant from the light source, preferably, in such end portion of the upper surface of the projecting portion which does not belong to the main expanding and reflecting area but exists on the side distant from the light source, the light expanding and reflecting portions may be formed such that the densities thereof decrease as they become more distant from the light source. Because the light reflecting layer reflects the light into the linear light guide member, in the end portion of the upper surface of the projecting portion existing distant from the light source, there exist two kinds of light: that is, one is the light which has moved through the linear light guide member toward the end face thereof; and, the other is the light which has been reflected by the light reflecting layer. As a result of this, the amount of light in the end portion in the end portion distant from the light source is increased. Here, when, in the end portion distant from the light source, the light expanding and reflecting portions are formed such that the densities thereof decrease as they part away from the light source, there can be reduced a light expansion and reflection effect accordingly. As a result of this, the excessive light emission in the end portion distant from the light source can be prevented, which in turn can reduce the uneven amount of light emitted.

Besides a linear light guide member which is colorless and transparent, there can also be used a colored linear light guide member. For example, coloring such as a pigment may be contained in a linear light guide member. Or, a color changing layer may be provided on the lower surface of a linear light guide member (the surface of the linear light guide member that exists on the opposite side to the projecting portion). In such arrangement, it is possible for the light source to emit the light having a color which is different from the original color thereof. The color changing layer may also be provided in a portion of the lower surface of the linear light guide member not in the entire area of the lower surface. By the way, the color changing layer can be formed, for example, by printing a fluorescent agent, by bonding a color changing film, by applying light transmissible ink, by bonding a colored light transmissible tape, or by forming a colored light transmissible resin layer.

According to a second embodiment of the invention, a linear light emitting apparatus includes a first light source, a second light source, a first linear light guide member and a second linear light guide member. The first and second linear light guide members are similar in structure to the above-mentioned linear light guide member. Specifically, the first and second linear light guide members are structured such that: their respective longitudinal axes are arranged on the same straight line; and, their respective first end faces are disposed so as to be opposed to each other and these opposed end faces are connected together. Further, to the other end face or second end face of the first linear light guide member, there is guided the light of the first light source; and, to the other end face or second end face of the second linear light guide member, there is guided the light of the second light source. In this structure, it is possible to provide a linear light emitting apparatus the length of which is large. Moreover, there may also be provided a light reflecting layer in the connecting portion between the first and second linear light guide members.

Preferably, in such end portion of the upper surface of the projecting portion of the first linear light guide member that exists on the side distant from the first light source, light expanding and reflecting portions may be formed such that the densities thereof decrease as they becomes distant from the first light source; and, in such end portion of the upper surface of the projecting portion of the second linear light guide member that exists on the side distant from the second light source, light expanding and reflecting portions may be formed such that the densities thereof decrease as they become distant from the second light source. Preferably, the light expanding and reflecting portions may be formed such that the densities thereof decrease toward the end face connecting portion. Otherwise, since the light of first light source and the light of the second light source arrive in the vicinity of the end face connecting portion, the amount of the light existing there becomes large. However, when the structure according to the second embodiment is employed, the excessive emission of the light can be prevented in the vicinity of the connecting portion, which can in turn reduce the uneven emission of the light.

Now, according to a third embodiment of the invention, two light sources are disposed such that they are respectively opposed to the two ends of a linear light guide member. In the present linear light guide member, there is provided a projecting portion which is similar to the above-mentioned linear light guide member; and, in the upper surface of the projecting portion, there are formed light expanding and reflecting portions each which extends over the entire width of the upper surface of the projecting portion. The light expanding and reflecting portions are formed such that the densities thereof increase as they approaches the center of the linear light guide member from the two end faces of the linear light guide member. According to the thus formed light expanding and reflecting portions, in the vicinity of the center of the linear light guide member where the amount of light is smallest because the amount of light decreases as it becomes distant from the light sources disposed in the two ends of the linear light guide member, a light expansion and reflection effect can be enhanced, thereby being able to reduce the uneven amount of light emitted.

Now, description will be given below of the embodiments of a linear light emitting apparatus according to the invention.

Embodiment 1

Figure 2:
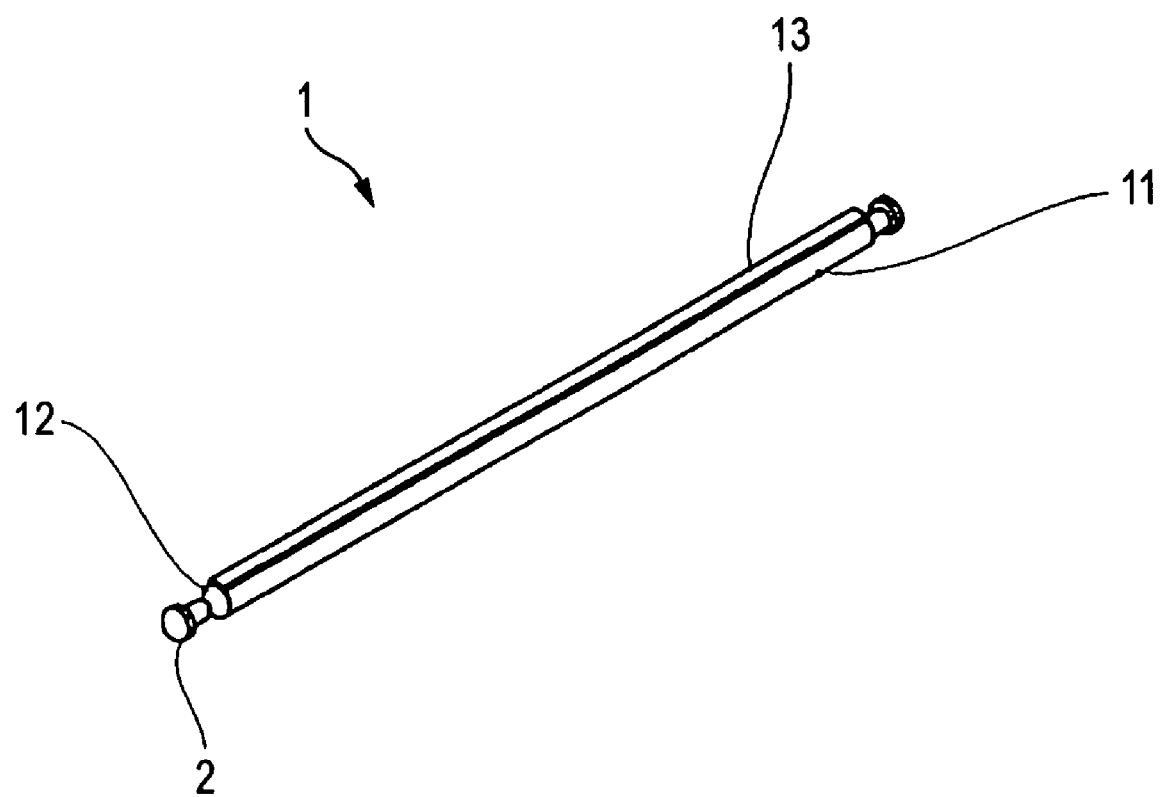
FIG. 2 is a perspective view of the linear light emitting apparatus 1.
Figure 3:
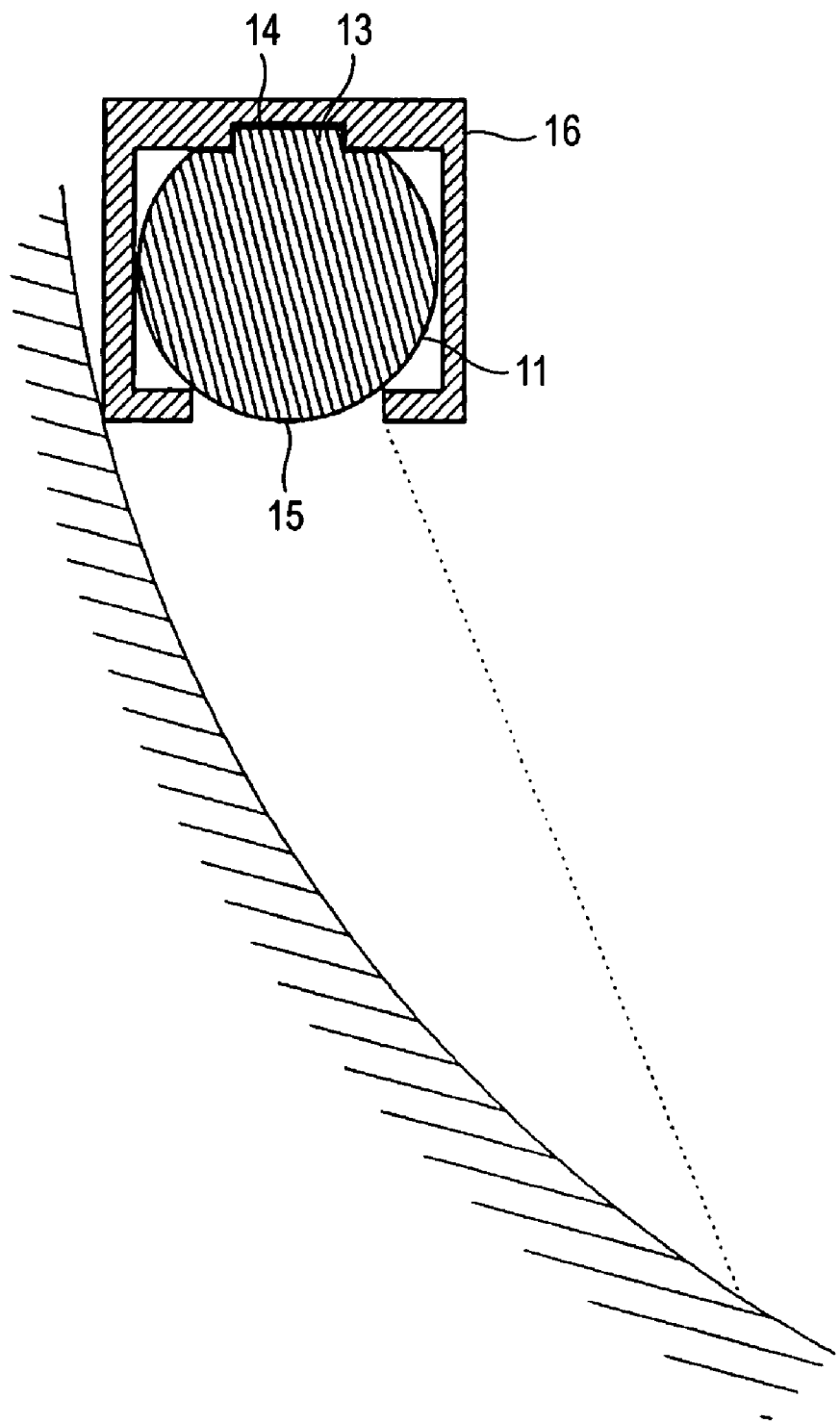
FIG. 3 is a longitudinal section view of a linear light guide member 11.

FIG. 1 is a perspective view of a vehicle 100 which uses a linear light emitting apparatus 1 according to the first embodiment of the invention. The linear light emitting apparatus 1 is disposed along the side of the interior ceiling of the vehicle 100. FIG. 2 is a perspective view of the linear light emitting apparatus 1. The linear light emitting apparatus 1 includes a linear light guide member 11 and a light source 2. The linear light guide member 11 is made of acryl resin. The light source 2 is a lamp-type white color LED lamp. The light source 2 is disposed in such a manner that the light emitting side thereof is opposed to the end face 12 of the linear light guide member 11. The linear light guide member 11 has a substantially cylindrical shape having a length of 1 m and a diameter of about 8 mm; and, as shown in FIG. 3 which is a longitudinal section view of the linear light guide member 11, on the upper surface side of the linear light guide member 11, there is provided a projecting portion 13 having a width of about 2 mm. The projecting portion 13 is formed continuously along the longitudinal axis of the linear light guide member 11. The upper surface 14 of the projecting portion 13 is formed as a plane. The lower portion of the linear light guide member 11 (the opposite portion to the projecting portion 13) provides a light emitting portion 15. As shown in FIG. 3, the linear light emitting apparatus 1 is disposed within a casing 16. The lower portion of the casing 16 is opened and the light emitted from the light emitting portion 15 is radiated through this opening. The linear light guide member 11 is formed by extrusion molding.

Figure 4:
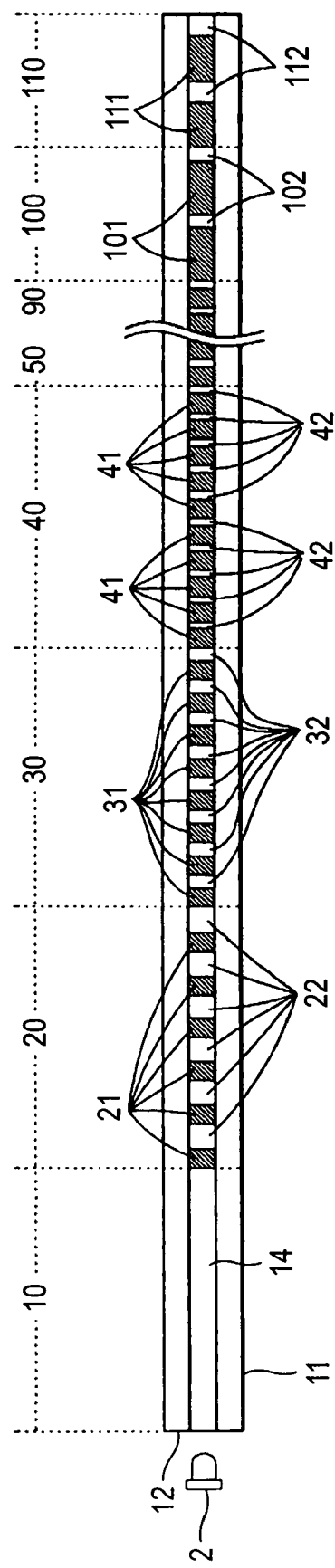
FIG. 4 is a view of the upper surface of the linear light guide member 11.

FIG. 4 is a view of the upper surface of the linear light guide member 11. The linear light guide member 11 is divided from the light source 2 side end face 12 thereof toward the distant-from-light-source-2 side end face 15 thereof into the following blocks in the illustrated order: that is, a first block 10, a second block 20, a third block 30, a fourth block 40, a fifth block 50, a sixth block 60, a seventh block, an eighth block, a ninth block 90, a tenth block 100 and an eleventh block 110. The lengths of the first to ninth blocks are respectively 10 cm in the longitudinal axis direction of the linear light guide member 11. The lengths of the tenth and eleventh blocks 100 and 110 are respectively 5 cm in the longitudinal axis direction. In the upper surface 14 of the first block 10, there is not formed any light expanding and reflecting portion. In the upper surface 14 of the second block 20, there are formed six light expanding and reflecting portions 21 at intervals of about 8.7 mm, while each light expanding and reflecting portion 21 has a length of about 8.0 mm. In the upper surface 14 of the third block 30, there are formed eight light expanding and reflecting portions 31 at intervals of about 4.5 mm, each having a length of about 8.0 mm. In each of the upper surfaces 14 of the fourth to ninth blocks 40 to 90, there are formed ten light expanding and reflecting portions 41 at intervals of 2.0 mm, each having a length of about 8.0 mm. In the upper surface 14 of the tenth block 100, there are formed two light expanding and reflecting portions 101 at intervals of 5.5 mm, each having a length of about 19.5 mm. In the upper surface 14 of the eleventh block 110, there are formed two light expanding and reflecting portions 111 at intervals of 8.0 mm, each having a length of about 17.0 mm. In the structure where the respective light expanding and reflecting portions are formed in the above-mentioned manner, the ratios (that is, densities) of areas to be occupied by the respective light expanding and reflecting portions in their associated blocks increase from the second block 20 toward the fourth block 40. On the other hand, in the tenth and eleventh blocks 100 and 110, the area ratios of the light expanding and reflecting portions decrease as they are become distant from the light source (that is, they approach the end face 15). By the way, the light expanding and reflecting portions 21~111 are formed by printing an epoxy-system white color paint. And, the light expanding and reflecting portions 21~111 are respectively formed so as to extend over the entire width of the projecting portion upper surface 14 having a uniform width. This not only makes it easy for the light expanding and reflecting portions 21~111 to have the same width but also can form them with high precision without moving their positions from each other. On the other hand, in the areas of the upper surface 14 respectively designated by reference numerals 22, 32, 42, 102, and 112, there is formed no light expanding and reflecting portion. On the end face 15 situated on the opposite side to the light source 2 of the linear light guide member 11, there is enforced a light reflecting processing which is carried out by printing an epoxy system white color paint.

Now, description will be given below of the light emitting manner of the linear light emitting apparatus 1. The light emitted from the light source 2 comes into the linear light guide member 11 from the end face 12 of the linear light guide member 11. The incident light is guided through the linear light guide member 11 while being reflected by the upper surface 14. Of such light, the light having arrived at the light expanding and reflecting portions 21~111 of the upper surface 14 are expanded and reflected by them and are positively emitted from the light emitting portion 15 to the outside. Since, as described above, the light expanding and reflecting portions 21~111 are formed with high precision without being shifted in position from each other, the linear light, which has been expanded and reflected by the light expanding and reflecting portions 21~111 and has been then emitted, is allowed have a uniform line width. Further, because the width-direction ends (edges) of the light expanding and reflecting portions 21~111 are coincident with the end of the upper surface of the projecting portion 13, the width-direction boundary of the linear light can be distinguished clearly, whereby the edges of the light expanding and reflecting portions can be distinguished clearly. As a result of this, the edge of the linear light emitted is clear and thus the linear light can be distinguished clearly.

Also, the light expanding and reflecting portions 21~41 are formed in such a manner that the ratios of areas occupied by these light expanding and reflecting portions in the second to the fourth blocks 20 to 40 increase. Thus, in the second to the fourth blocks 20 to 40, a light expansion and reflection effect by the upper surface 14 increases as the light parts away from the light source 2. As a result of this, the light take-out ratio in the area, which is distant from the light source 2 and in which the amount of light arriving is small, can be enhanced, thereby being able to reduce the uneven amount of light emitted. Further, because the end face 15 is formed as the reflecting surface, in the vicinity of the end face 15, there exist two kinds of light: that is, one is the light which is guided toward the end face 15 through the linear light guide member 11; and, the other is the light which is reflected into the linear light guide member 11 by the end face 15. Here, in the tenth and eleventh blocks 100 and 110 which are present in the vicinity of the end face 15, the ratios of areas occupied by the light expanding and reflecting portions 101 and 111 decrease as they approach the end face 15 and, therefore, as they approach the end face 15, the light expansion and reflection effect decreases. According to this, in the end face 15 neighboring area where there exist the two kinds of light, the excessive emission of light is prevented, which can reduce the uneven amount of light emitted. Further, in the first block 10 which is the light source 2 neighboring area, there is formed no light expanding and reflecting portion. Owing to this, in the light source 2 neighboring area, the light is not emitted to the outside positively. And, the light, which has not been emitted from the light source 2 neighboring area, is guided through the linear light guide member 11 and is used as the light of the area that is distant from the light source 2. As a result of this, the light emission amount in the light source 2 neighboring area, in which the amount of light is large, can be reduced, whereas the light emission amount in the area distant from the light source 2, in which the amount of light is small, can be increased, whereby the uneven amount of light emitted can be reduced.

Figure 5:
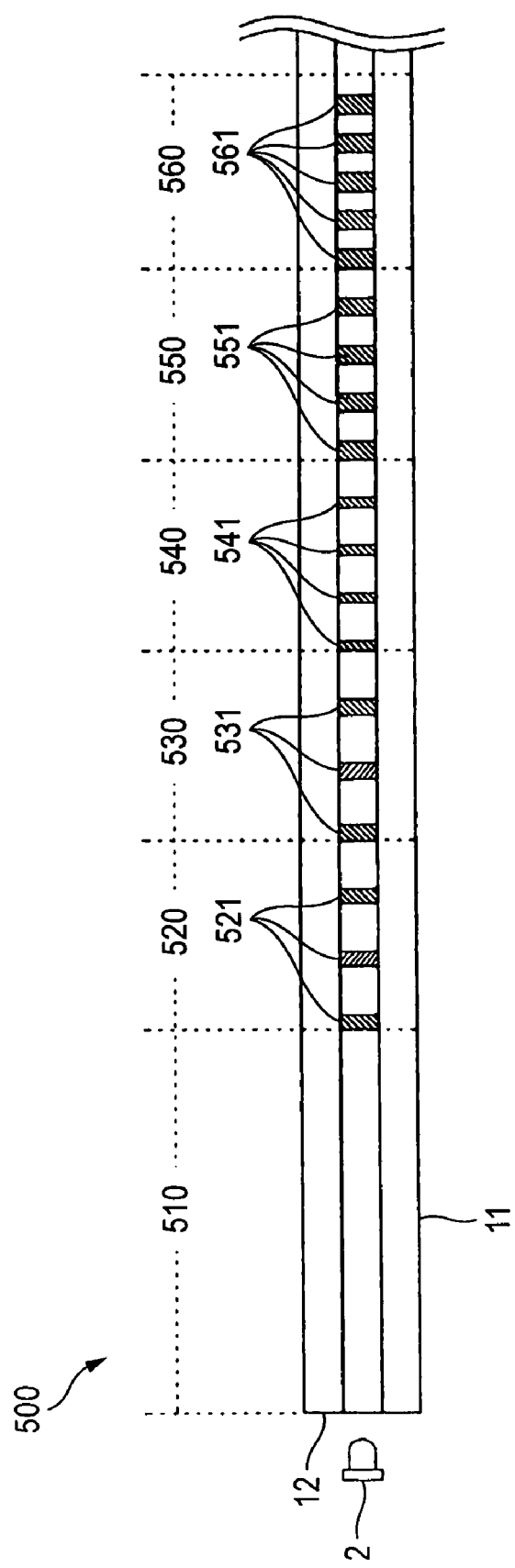
FIG. 5 is a view of the upper surface of a linear light guide member 11 according to a modification of the first embodiment of the invention.

Of the light expanding and reflecting portions formed in the upper surface of the projecting portion 13 of the linear light guide member 11, the light expanding and reflecting portions 21~41 are formed to have the same length; however, there may be included such light expanding and reflecting portions that are different in length. Now, FIG. 5 shows a modification of the first embodiment which is different from the first embodiment in the length and arrangement of the light expanding and reflecting portion. As shown in FIG. 5, in the linear light guide member 11, a portion thereof extending 10 cm from the end face 12 opposed to the light source 2 is used as a first block 510: and, after then, the linear light guide member 11 is divided every 5 cm into a second block 520, a third block 530, a fourth block 540, a fifth block 550 and a sixth block 560. In the first block 510, there is formed no light expanding and reflecting portion. In the upper surface 14 of the second block 520, there are formed three light expanding and reflecting portions 521 at intervals of about 12.4 mm, each having a length of about 4.3 mm. In the upper surface 14 of the third block 530, there are formed three light expanding and reflecting portions 531 at intervals of about 11.9 mm, each having a length of about 4.8 mm. In the upper surface 14 of the fourth block 540, there are formed four light expanding and reflecting portions 541 at intervals of about 9.5 mm, each having a length of about 3.0 mm. In the upper surface 14 of the fifth block 550, there are formed four light expanding and reflecting portions 521 at intervals of about 7.5 mm, each having a length of about 5.0 mm. In the upper surface 14 of the sixth block 560, there are formed five light expanding and reflecting portions 561 at intervals of about 5.2 mm, each having a length of about 4.8 mm. Even when these light expanding and reflecting portions 521~561 are employed, there can be provided a similar effect to the above-mentioned light expanding and reflecting portions 21~41.

Embodiment 2

Figure 6:
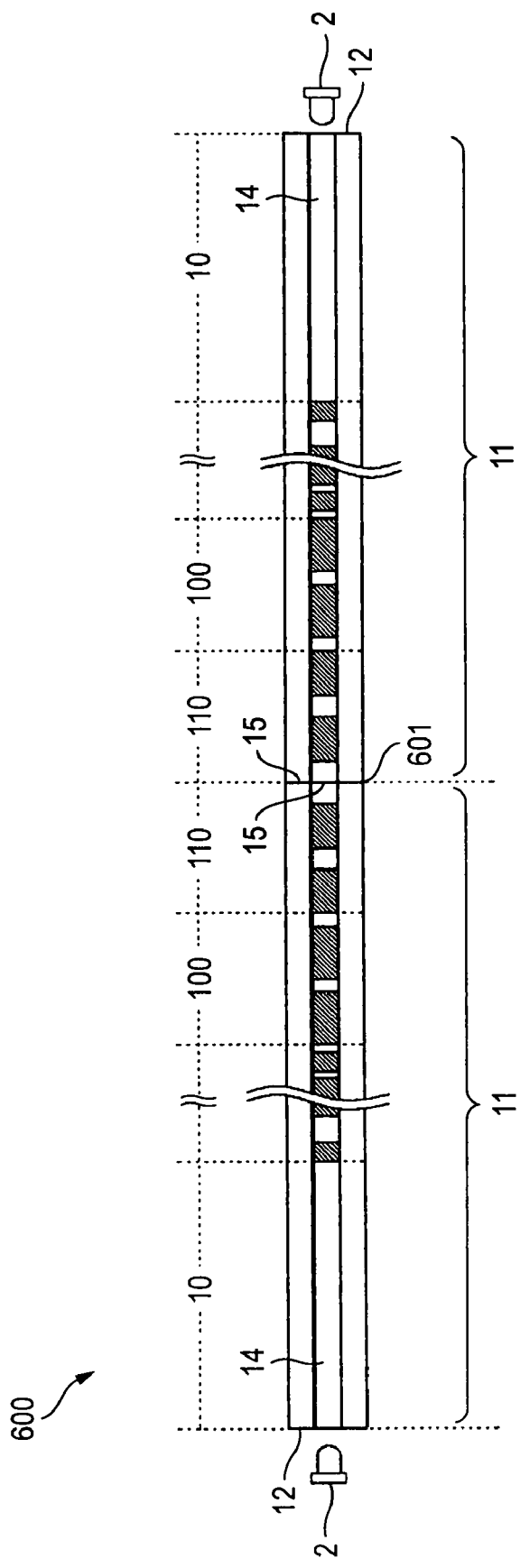
FIG. 6 is a view of the upper surfaces of two linear light guide members 11 used in a linear light emitting apparatus 600 according to a second embodiment of the invention.

Now, description will be given below of a linear light emitting apparatus 600 according to a second embodiment of the invention. In this embodiment, the same parts thereof as those of the linear light emitting apparatus 1 are given the same designations and the description thereof is omitted here. The linear light emitting apparatus 600 includes two linear light guide members 11. In FIG. 6, there are shown the upper surfaces of the two linear light guide members 11. The two linear light guide members 11 are disposed in such a manner that their respective longitudinal axes are on the same straight line. Further, the end faces 15 of the two linear light guide members 11 are connected together through a light reflecting layer 601 in such a manner that a projecting portion 13 is formed in a continuous manner.

In the linear light emitting apparatus 600, since the two linear light guide members 11 are connected together in the longitudinal axis direction thereof when they are used, it is possible to emit the linear light that is longer than in the first embodiment. In the vicinity of the connecting portion between the two linear light guide members 11, the two kinds of light of the light sources 12 are reflected into the linear light guide members 11 by the light reflecting layer 601, the amount of light in the vicinity of the connecting portion increases; however, in the tenth blocks 100 and eleventh blocks 110 which are respectively present near to their respective end faces 15, the ratios of areas occupied by the light expanding and reflecting portions decrease as they approach the end faces 15. Therefore, the light expansion and reflection effects of the light expanding and reflecting portions reduce as they approach the end faces 15, whereby the excessive emission of light can be prevented in the vicinity areas of the end faces 14. As a result of this, the uneven amount of light emitted can be reduced.

Embodiment 3

Figure 7:
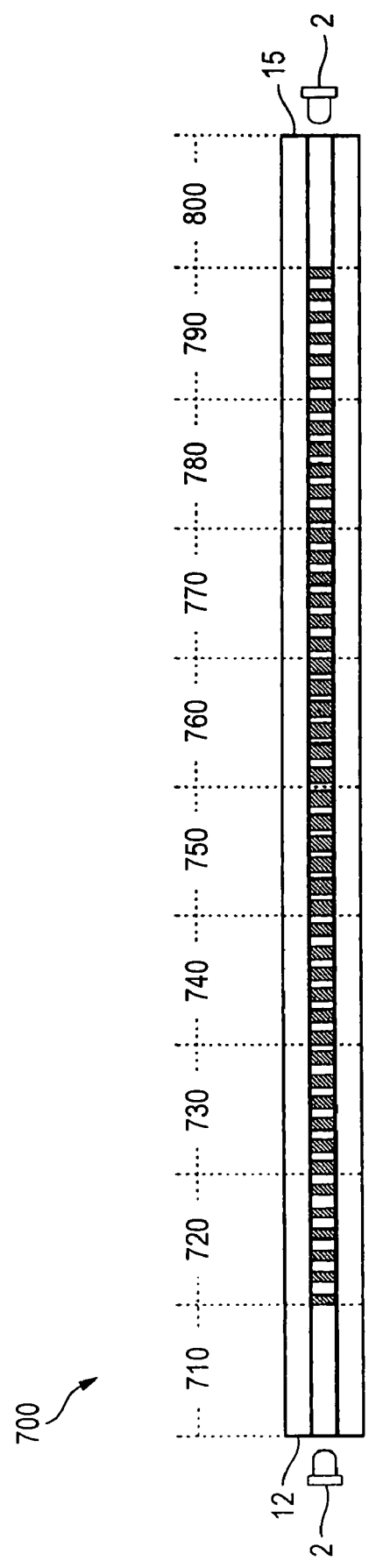
FIG. 7 is a view of the upper surface of a linear light guide member 11 used in a linear light emitting apparatus 600 according to a third embodiment of the invention.

Further, according to a third embodiment of the invention, the light may also be guided from the two ends of a single linear light guide member 11. Here, FIG. 7 shows the lengths and arrangements of the light expanding and reflecting portions of a linear light emitting apparatus 700 structured such that the light is guided from the two ends of the single linear light guide member 11. To the end faces 12 and 15 of the linear light guide member 11, there are opposed the light emitting sides of two light sources 2. The linear light guide member 11 is divided every about 10 cm from the end face 12 into ten blocks: that is, a first block 710, a second block 720, a third block 730, a fourth block 740, a fifth block 750, a sixth block 760, a seventh block 770, an eighth block 780, a ninth block 790 and a tenth block 800. In the blocks existing in the first positions in the order starting from the two end faces 12 and 15, that is, in the first block 710 and tenth block 800, there is formed no light expanding and reflecting portion. In each of the second block 720 and ninth block 790, there are formed six light expanding and reflecting portions 721, 791 at intervals of about 8.7 mm, each having a length of about 8.0 mm. In each of the third and eighth blocks 730 and 780, there are formed six light expanding and reflecting portions 731, 781 at intervals of about 7.2 mm, each having a length of about 9.5 mm. In each of the fourth and seventh blocks 740 and 770, there are formed six light expanding and reflecting portions 741, 771 at intervals of about 5.7 mm, each having a length of about 11.0 mm. In each of the fifth and sixth blocks 750 and 760, there formed six light expanding and reflecting portions 751, 761 at intervals of about 4.2 mm, each having a length of about 12.5 mm. According to this manner of formation, the light expanding and reflecting portions 721~791 are arranged closely step by step from the two ends 12 and 15 toward the center of the linear light guide member 11 in the longitudinal axis direction thereof. Although the center of the linear light guide member 11 in the longitudinal axis direction thereof tends to be small in the amount of light, when the light expanding and reflecting portions 721~791 are arranged in this manner, the light expansion and reflection effects of the light expanding and reflecting portions increase toward the center of the linear light guide member 11, which makes it possible to reduce the uneven amount of light emitted.

Now, description will be given below in detail of composing elements used in fourth to sixth embodiments of a linear light emitting apparatus according to the invention.

(Light Source)

The light source is not limited to a specific type but, preferably, there may be used an LED lamp, because the LED lamp has advantages in that it is compact and is strong against vibrations and shocks. The LED is not limited to any specific type but there can be used various types such as a lamp type and an SMD type. Most preferably, there may be used a lamp-type LED lamp. Since the light of the lamp-type LED lamp is high in directivity, the lamp-type LED lamp can guide the light to a linear light guide member (which will be discussed later) more efficiently than LED lamps of other types. The light emitting color of the LED lamp is not limited to any specific color but it is possible to use a white color LED lamp containing two or more light colors (wavelengths). It is also possible to use two or more LED lamps as the light sources.

(Linear Light Guide Member)

As the materials of the linear light guide member, there can be used synthetic resin such as acrylic resin, polycarbonate resin, polyethylene terephthalate (PET) resin, silicone resin and epoxy resin, as well as light transmissible material such as inorganic material including glass. And, these materials may be combined together to provide a linear light guide member. Most preferably, there may be used the acrylic resin. The acrylic resin provides a small light expansion action and thus can provide a high light guide action. Also, from the viewpoint of securing sufficient strength and shock resistance, preferably, there may be used the polycarbonate resin.

The linear light guide member is disposed in such a manner that the light of the light source is allowed to enter it from the end face thereof. For example, the longitudinal section of the linear light guide member provides a substantially circular shape, a substantially elliptical shape, a triangular shape, a square shape, a pentagonal shape, a hexagonal shape, or a shape which can be obtained when these shapes are combined together properly. Also, when the radiation width provided by the linear light source is required to be uniform, the width of the linear light guide member may be set uniform.

The linear light guide member may also include a projecting portion which extends continuously along the longitudinal axis thereof. The projecting portion is composed of side surfaces and an upper surface. Preferably, the boundary between the side surface and upper surface of the projecting portion may be linear. The reason for this is that the edge of the light reflected by the upper surface of the projecting portion provides a straight line and thus the light can be distinguished clearly as linear light. The projecting portion, preferably, may be formed such that it has the same width over the whole portions thereof and the section of the light emitting surface of the linear light guide member is composed of a substantially circular-shaped curved surface. That is, the upper surface of the projecting portion may preferably be rectangular when the projecting portion is viewed from above. Referring again to the above description that the width of the projecting portion is set uniform, since the widths of the light expanding and reflecting portions and colored reflecting portions are also coincident with such width, the light expanding and reflecting portions and colored reflecting portions having the same width can be easily formed with high precision. The upper surface of the projecting portion may be a plane or a curved surface. The size of the linear light guide member and the size of the projecting portion can be decided with the size of a target illumination area taken into consideration. For example, the linear light guide member may be formed as a cylindrical body having a diameter of 8 mm and a length of 1 m, and the projecting portion may be formed such that the upper surface thereof has a uniform width of 2 mm. The linear light guide member can be formed according to a well-known method such as a molding operation (for example, an extrusion molding operation and an injection molding operation).

In the upper surface of the projecting portion, there are formed light expanding and reflecting portions as well as colored reflecting portions. The light expanding and reflecting portions can be formed by applying or printing an expanding and reflecting paint, or by enforcing a light expansion and reflection processing such as a drawing process, or by bonding a light expansion and reflection tape. Also, the colored reflecting portions can be formed by applying or printing a reflecting paint colored with a desired color, or by enforcing a coloring-printing-reflecting processing, or by bonding a coloring and reflecting tape. When the light expanding and reflecting portions as well as colored reflecting portions are formed by printing, there can be used an acrylic system paint, an epoxy system paint, a urethane system paint or the like. The light expanding and reflecting portions as well as colored reflecting portions are formed such that they extend over the entire width of the upper surface of the projecting portion. That is, of the upper surface of the projecting portion, continuously from one side to the other side which respectively are parallel to the longitudinal axis of the upper surface, there are formed the light expanding and reflecting portions as well as colored reflecting portions. The light expanding and reflecting portions are formed at given intervals in the longitudinal axis direction of the projection portion, while the colored reflecting portions are respectively disposed in the intervals of their associated light expanding and reflecting portions. For example, the light expanding and reflecting portion as well as colored reflecting portion are formed such that, as the more distant from the light source they are, the higher the densities thereof are. By the way, the term "density" used here means the ratio of an area, where the light expanding and reflecting portion or colored reflecting portion exists, to the unit area of the upper surface of the projecting portion. For example, when forming two or more light expanding and reflecting portions as well as colored reflecting portions having the same length, the distance between two mutually adjoining light expanding and reflecting portions or two mutually adjoining colored reflecting portions may be narrowed as they part away from the light source. In this case, as the light expanding and reflecting portions as well as colored reflecting portions become distant from the light source, the densities thereof increase. The distance between the two mutually adjoining light expanding and reflecting portions may be varied continuously or step by step. Also, the colored reflecting portions to be interposed between the light expanding and reflecting portions need not always be interposed between the two mutually adjoining light expanding and reflecting portions, but they may also be disposed every other light expanding and reflecting portion, or they may also be disposed in a gradually descending number. The distance between the two mutually adjoining light expanding and reflecting portions as well as two mutually adjoining colored reflecting portions is not limited to a specific distance, but it can be set in the range of, for example, about 0.5~10 mm. Also, the length of the light expanding and reflecting portion and the length of the colored reflecting portion (the width of the linear light guide member in the longitudinal axis direction) may be varied continuously or step by step. When the light expanding and reflecting portion is formed according to the drawing operation, the density of the drawing of the light expanding and reflecting portion on the side thereof distant from the light source may be set high to thereby enhance the light expansion and reflection property of the light expanding and reflecting portion. In this case, a light expansion and reflection action in the portion distant from the light source, where the amount of light tends to be short, can be enhanced to thereby contribute for reducing the uneven amount of light emitted.

According to the fourth embodiment of the invention, on the upper surface of the projecting portion, there is formed a main expanding and reflecting area. The main expanding and reflecting area is an area which of the upper surface of the projecting portion, includes a central area in the longitudinal axis direction of the upper surface and occupies most of the upper surface of the projecting portion. In the main expanding and reflecting area, preferably, the light expanding and reflecting portions as well as colored reflecting portions may be formed such that the longer the distance thereof from the light source is, the higher the density of the total area of the light expanding and reflecting portion and colored reflecting portion is. This arrangement can enhance a light expansion and reflection action in an area distant from the light source in the main expanding and reflecting area, thereby being able to reduce the luminance difference between an area near to the light source and an area distant from the light source. In the end portion of the upper surface of the projecting portion on the near-to-light-source side thereof except for the main expanding and reflecting area, preferably, there may not be formed a light expanding and reflecting portion and a coloring and reflecting portion. Since the end portion on the near-to-light-source side provides a large amount of light, when a light expanding and reflection portion is formed in the end portion area on the near-to-light-source side, an excessive amount of light is emitted, which leads to the uneven amount of light emitted. When neither the light expanding and reflection portion nor the colored reflecting portion is formed in the end portion on the near-to-light-source side, the light in the end portion on the near-to-light-source side can be used as the light of an area distant from the light source, thereby being able to prevent the occurrence of the uneven amount of light emitted.

In the linear light guide member, preferably, there may be provided a light reflecting layer on the end face thereof distant from the light source (the end face of the linear light guide member on the opposite side to an end face to which the light is guided). According to provision of such light reflecting layer, the light having arrived at the present end face can be reflected into the linear light guide member and thus can be used as the linear light of the linear light guide member. This can enhance the utilization rate of the light. The light reflecting layer can be formed by painting or printing an expansion and reflection material, or by enforcing a light expanding and reflecting processing such as a drawing operation, or by bonding a light expansion and reflection tape. Because the light reflecting layer reflects the light into the linear light guide member, in the end portion distant from the light source, there exist not only the light which has moved through the linear light guide member toward the end face thereof but also the light which has been reflected by the light reflecting layer. As a result of this, the amount of light in the end portion on the side distant from the light source is increased.

According to a fifth embodiment of the invention, a linear light emitting apparatus includes a first light source, a second light source, a first linear light guide member and a second linear light guide member. The first and second linear light guide members are similar in structure to the above-mentioned linear light guide member. Specifically, the first and second linear light guide members are structured such that: their respective longitudinal axes are arranged on the same straight line: and, their respective first end faces are disposed so as to be opposed to each other and these opposed end faces are connected together. Further, to the other end face or second end face of the first linear light guide member, there is guided the light of the first light source; and, to the other end face or second end face of the second linear light guide member, there is guided the light of the second light source. In this structure, it is possible to provide a long linear light emitting apparatus. Moreover, there may also be provided a light reflecting layer in the connecting portion between the first and second linear light guide members.

Preferably, the light expanding and reflecting portions which are to be formed in such end portion of the upper surface of the projecting portion of the first linear light guide member distant from the first light source, may be arranged such that the densities thereof decrease as they become distant from the first light source. The light expanding and reflecting portions and colored reflecting portions which are to be respectively formed in such end portion of the upper surface of the projecting portion of the second linear light guide member distant from the second light source, may be arranged such that the densities of the respective total areas thereof decrease as they become distant from the second light source. That is, preferably, the light expanding and reflecting portions and colored reflecting portions may be arranged such that the densities of the respective total areas thereof decrease toward the connecting portion. In other structure than this structure, since both of two kinds of light coming from the first and second light sources arrive in the vicinity of the connecting portion, the amount of the light in this area becomes large. On the other hand, when the present structure is employed, the excessive emission of the light can be prevented in the vicinity of the connecting portion, which can in turn reduce the uneven amount of the light emitted and the uneven shade of colors.

According to a sixth embodiment of the invention, two light sources are disposed such that they are respectively opposed to the two ends of a linear light guide member. In the present linear light guide member, there is provided a projecting portion which is similar to the above-mentioned linear light guide member; and, in the upper surface of the projecting portion, there are formed light expanding and reflecting portions as well as colored reflecting portions which respectively extend over the entire width of the upper surface of the projecting portion. The light expanding and reflecting portions and colored reflecting portions are formed such that the densities of the respective total areas thereof increase as they approach the center of the linear light guide member from the two end faces of the linear light guide member. According to the thus formed light expanding and reflecting portions as well as colored reflecting portions, in the vicinity of the center of the linear light guide member where the amount of light is smallest because the amount of light decreases as it becomes distant from the light sources disposed in the two ends of the linear light guide member, a light expansion and reflection effect can be enhanced, thereby being able to reduce the uneven amount of the light emitted and the uneven shade of colors.

Now, description will be given below of the embodiments of a linear light emitting apparatus according to the invention.

Embodiment 4

Figure 8:
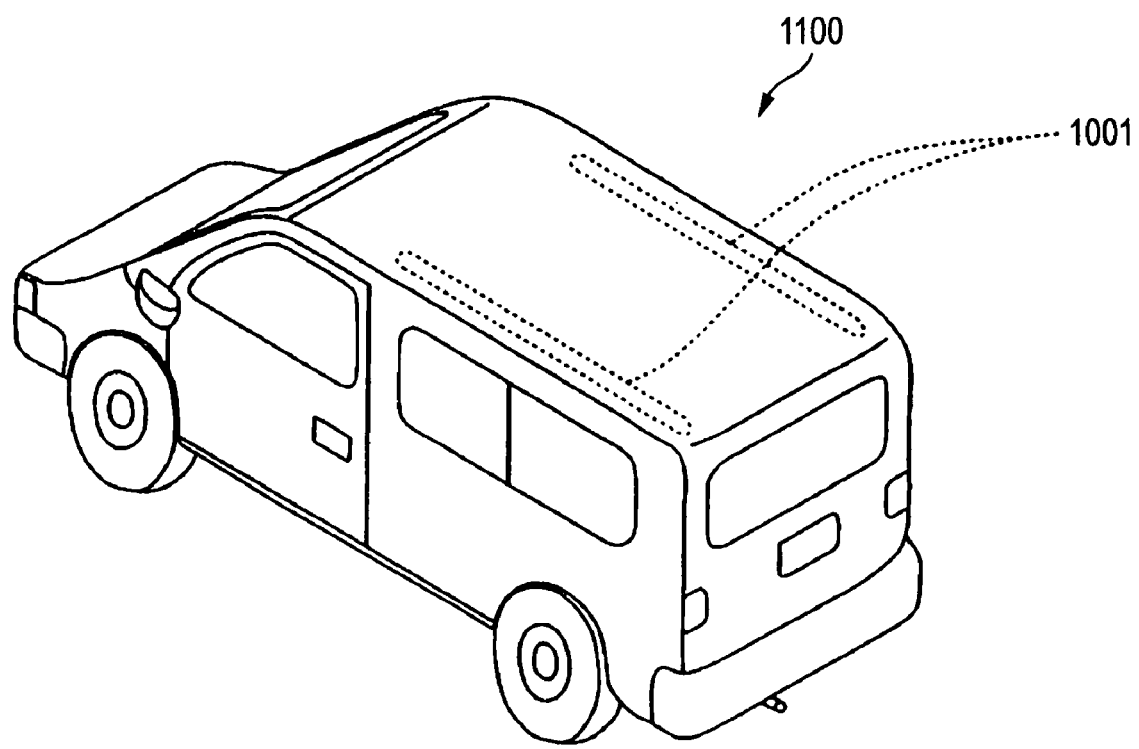
FIG. 8 is a perspective view of a vehicle 100 which uses a linear light emitting apparatus 1001 according to a fourth embodiment of the invention.
Figure 9:
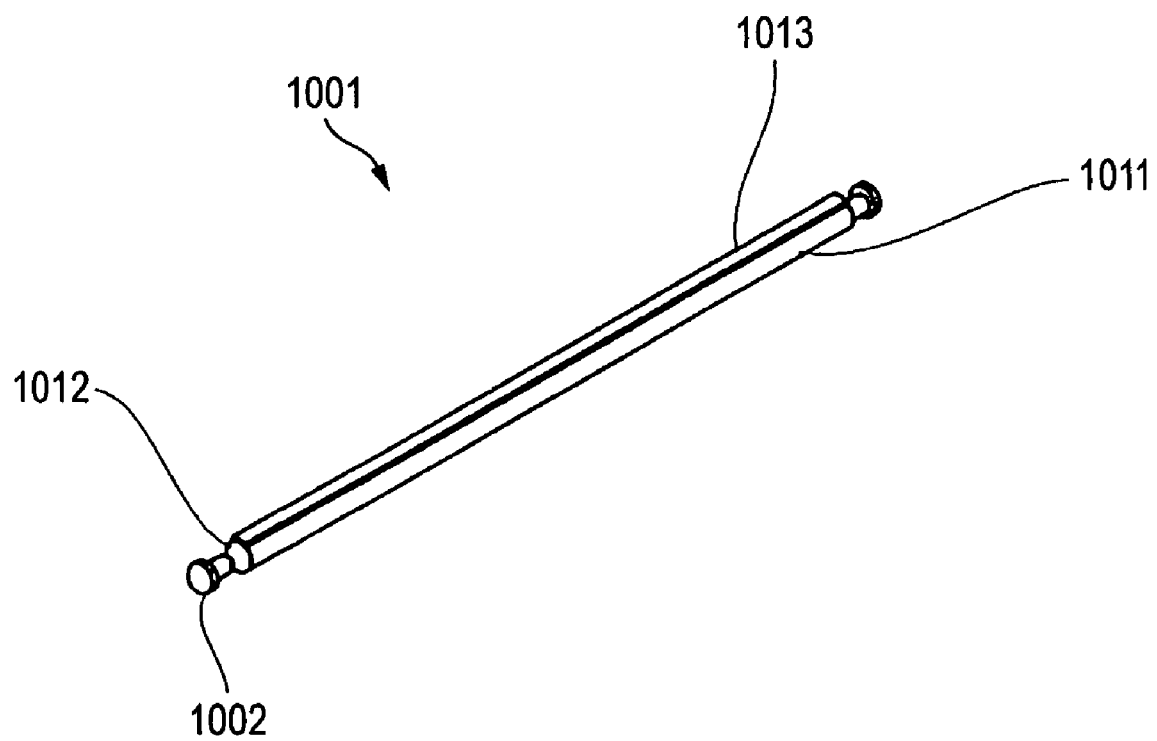
FIG. 9 is a perspective view of the linear light emitting apparatus 1001.
Figure 10:
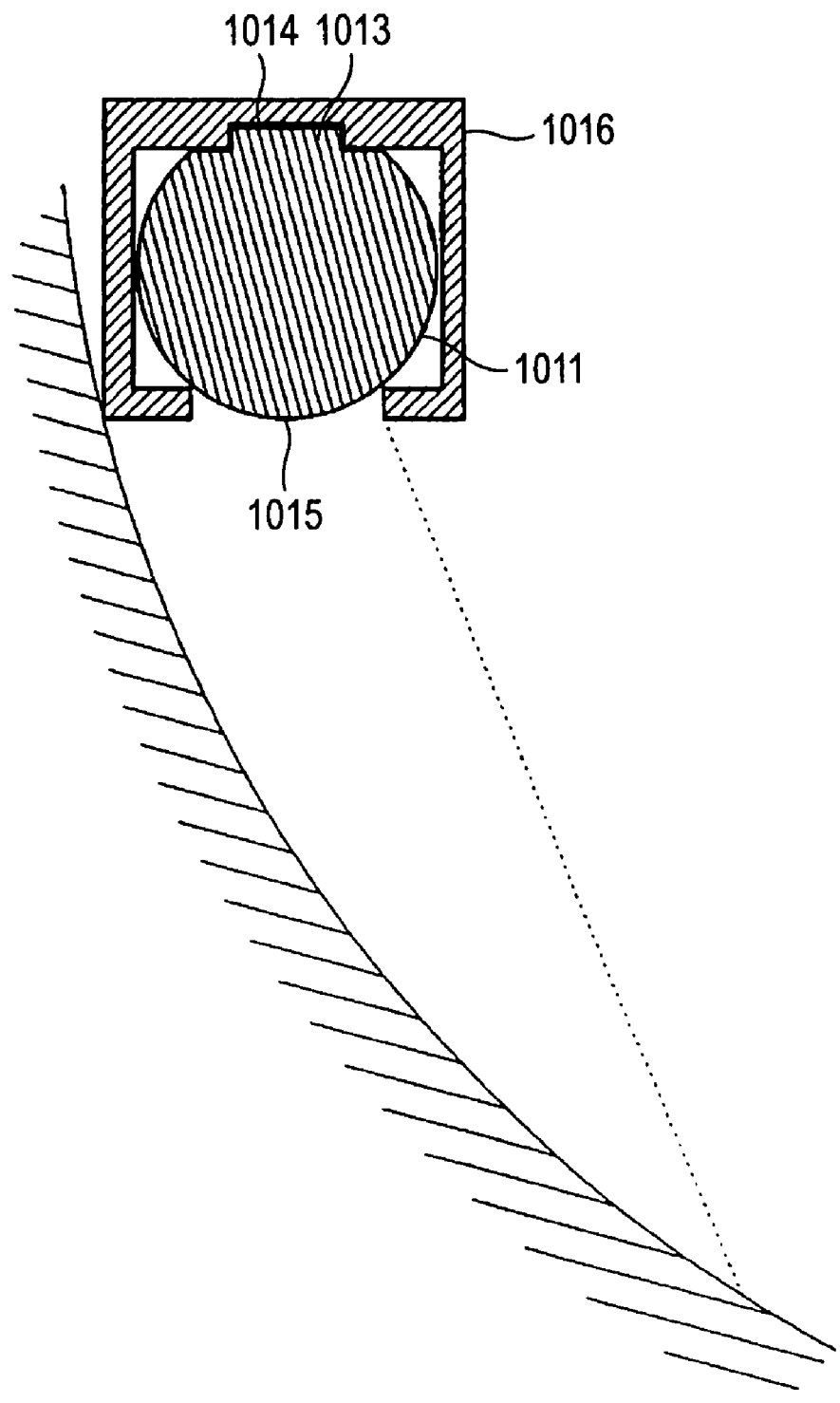
FIG. 10 is a longitudinal section view of a linear light guide member 1011.

FIG. 8 is a perspective view of a vehicle 100 which uses a linear light emitting apparatus 1001 according to the fourth embodiment of the invention. The linear light emitting apparatus 1001 is disposed along the side of the interior ceiling of the vehicle 1100. FIG. 9 is a perspective view of the linear light emitting apparatus 1001. The linear light emitting apparatus 1001 includes a linear light guide member 1011 and a white color LED light source 1002. The linear light guide member 1011 is made of acryl. The light source 1002 is a lamp-type white color LED lamp. The white color LED light source 1002 is disposed in such a manner that the light emitting side thereof is opposed to the end face 1012 of the linear light guide member 1011. The linear light guide member 1011 has a substantially cylindrical shape having a length of 1 m and a diameter of 8 mm; and, as shown in FIG. 10 which is a longitudinal section view of the linear light guide member 1011, on the upper surface side of the linear light guide member 1011, there is provided a projecting portion 1013 having a width of about 2 mm. The projecting portion 1013 is formed continuously along the longitudinal axis of the linear light guide member 1011. The upper surface 1014 of the projecting portion 1013 is a plane. The lower portion of the linear light guide member 1011 (the opposite portion to the projecting portion 1013) provides a light emitting portion 1015. As shown in FIG. 10, the linear light emitting apparatus 1001 is disposed within a casing 1016. The lower portion of the casing 1016 is opened and the light from the light emitting portion 1015 is radiated through this opening. The linear light guide member 1011 is formed by extrusion molding.

Figure 11:
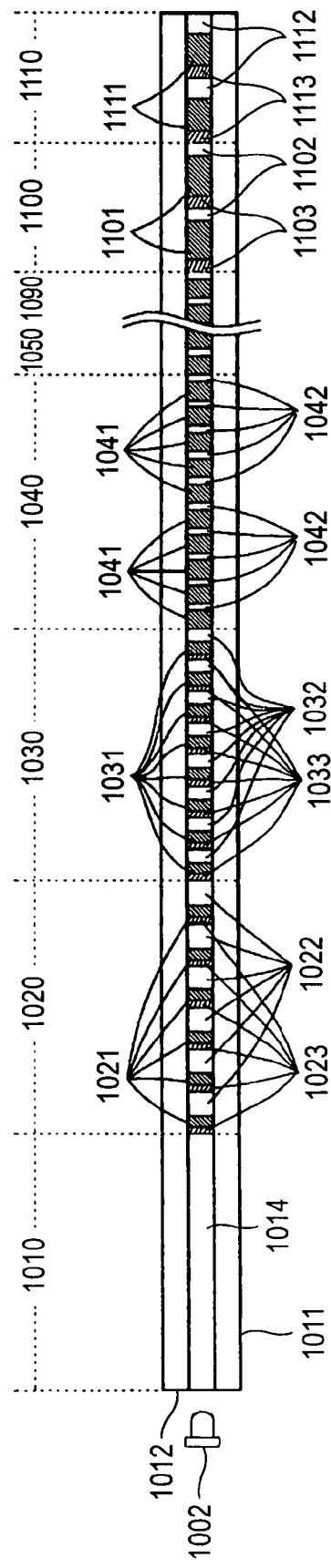
FIG. 11 is a view of the upper surface of the linear light guide member 1011.

FIG. 11 is a view of the upper surface of the linear light guide member 1011. The linear light guide member 1011 is divided from the white color LED light source 1002 side end face 1012 toward the end face 1015 thereof on the side distant from the light source 1002 into the following blocks in the illustrated order: that is, a first block 1010, a second block 1020, a third block 1030, a fourth block 1040, a fifth block 1060, a sixth block 1060, a seventh block 1070, an eighth block 1080, a ninth block 1090, a tenth block 1100 and an eleventh block 1110. The lengths of the first to ninth blocks are respectively 10 cm in the longitudinal axis direction of the linear light guide member 1011. The lengths of the tenth and eleventh blocks 1100 and 1110 are respectively 5 cm in the longitudinal axis direction. Neither a light expanding and reflecting portion nor a colored reflecting portion is formed in the upper surface 1014 of the first block 1010. In the upper surface 1014 of the second block 1020, there are formed, at intervals of about 8.7 mm, six light expanding and reflecting portions 1021 each having a length of about 5.0 mm and six colored reflecting portions 1023 each having a length of about 3.0 mm. In the upper surface 1014 of the third block 1030, there are formed, at intervals of about 4.5 mm, eight light expanding and reflecting portions 1031 each having a length of about 5.0 mm and eight colored reflecting portions 1033 each having a length of 3.0 mm. In each of the upper surfaces 1014 of the fourth to ninth blocks 1040 to 1090, there are formed, at intervals of 2.0 mm, ten light expanding and reflecting portions 1041 each having a length of about 8.0 mm. In the upper surface 1014 of the tenth block 1100, there are formed, at intervals of 5.5 mm, two light expanding and reflecting portions 1101 each having a length of about 16.0 mm and two colored reflecting portions 1102 each having a length of about 3.6 mm. In the upper surface 1014 of the eleventh block 1110, there are formed, at intervals of 8.0 mm, two light expanding and reflecting portions 1111 each having a length of about 17.0 mm and two colored reflecting portions 1112 each having a length of about 2.0 mm. In the structure where the light expanding and reflecting portions and colored reflecting portions are formed in the above-mentioned manner, the ratios (that is, densities) of the total areas to be occupied by the light expanding and reflecting portions and colored reflecting portions in their associated blocks increase from the second block 1020 toward the fourth block 1040. On the other hand, in the tenth and eleventh blocks 1100 and 1110, the ratios of the total areas to be occupied by the light expanding and reflecting portions and colored reflecting portions decrease and as they are become distant from the light source (that is, as they approach the end face 1015). By the way, the light expanding and reflecting portions 1021~1111 are formed by printing an epoxy-system white color paint. Also, since the portion near to the white color LED light source 1002 is generally strong in blue, in this portion, colored reflecting portions 1022 and 1023 colored in a yellow color which is the complementary color of a blue color are formed by printing a yellow paint. Also, since the portion distant from the white color LED light source 1002 is generally weak in blue, colored reflecting portions 1103 and 1113 colored in blue are formed by printing a blue paint. And, the light expanding and reflecting portions 1021~1111 and colored reflecting portions 1023~1113 are formed so as to extend over the entire width of the projecting portion upper surface 1014 having a uniform width. This not only makes it easy for the light expanding and reflecting portions 1021~1111 as well as the colored reflecting portions 1023~1113 to have the same width but also can form them with high precision without shifting in position from each other. On the other hand, in the portions of the upper surface 14 which are respectively designated by reference numerals 1022, 1032, 1042, 1102, and 1112, there is formed no light expanding and reflecting portion. On the end face 1015 situated on the opposite side to the white color LED light source 1002 of the linear light guide member 1011, there is enforced a light reflecting processing which is carried out by printing an epoxy system white color paint.

Now, description will be given below of the light emitting manner of the linear light emitting apparatus 1001. The light emitted from the white color LED light source 1002 comes into the linear light guide member 1011 from the end face 1012 of the linear light guide member 1011. The incident light is guided through the linear light guide member 1011 while being reflected by the upper surface 1014. Of such light, the light having arrived at the light expanding and reflecting portions 1021~1111 and colored reflecting portions 1023~1113 of the upper surface 1014 are expanded and reflected by them and are positively emitted from the light emitting portion 1015 to the outside. Since, as described above, the light expanding and reflecting portions 1021~1111 and colored reflecting portions 1023~1113 are formed with high precision without shifting in position from each other, the linear light, which is expanded and reflected by the light expanding and reflecting portions 1021~1111 and colored reflecting portions 1023~1113 and is then emitted, is allowed to have a uniform line width. Further, because the width-direction ends (edges) of the light expanding and reflecting portions 1021~1111 and colored reflecting portions 1023~1113 are coincident with the end of the upper surface of the projecting portion 1013, the width-direction boundary of the linear light is made clear. This makes clear the edges of the light expanding and reflecting portions. As a result of this, the edge of the linear light emitted is clear.

Also, the light expanding and reflecting portions 1021~1041 and colored reflecting portions 1023~1043 are formed in such a manner that the ratios of areas occupied by the light expanding and reflecting portions and colored reflecting portions in the second to the fourth blocks 1020 to 1040 increase. Thus, in the second to the fourth blocks 1020 to 1040, a light expansion and reflection effect by the upper surface 1014 increases as they part away from the white color LED light source 1002. As a result of this, the light take-out ratio in the portion, which is distant from the white color LED light source 1002 and in which the amount of light arriving is small, can be enhanced, thereby being able to reduce the uneven amount of light emitted. Further, because the end face 1015 is formed as the reflecting surface, in the vicinity of the end face 1015, there exist two kinds of light: that is, one is the light which is guided toward the end face 1015 through the linear light guide member 1011; and, the other is the light which is reflected into the linear light guide member 1011 by the end face 1015. Here, in the tenth and eleventh blocks 1100 and 1110 which are present in the vicinity of the end face 1015, the ratios of the total areas to be occupied by the light expanding and reflecting portions 1101, 1111 and colored reflecting portions 1103, 1113 decrease as they approach the end face 1015 and, therefore, as they approach the end face 1015, the light expansion and reflection effect lowers. According to this, in the end face 1015 neighboring area where there exist the two kinds of light, the excessive emission of the light is prevented, which can reduce the uneven amount of light emitted. Further, in the first block 1010 which is present near to the white color LED light source 1002, there is formed no light expanding and reflecting portion. Owing to this, in the neighboring area of the white color LED light source 1002, the light is not emitted to the outside positively. And, the light, which has not been emitted from the neighboring area of the white color LED light source 1002, is guided through the linear light guide member 1011 and is used as the light of the area that is distant from the light source 1002. As a result of this, the amount of light emitted in the neighboring area of the white color LED light source 1002, in which the amount of light is originally large, can be reduced, whereas the amount of light emitted in the area distant from the white color LED light source 1002, in which the amount of light is originally small, can be increased, whereby the uneven amount of light emitted can be reduced.

Of the light expanding and reflecting portions and colored reflecting portions formed in the upper surface of the projecting portion 1013 of the linear light guide member 1011, the light expanding and reflecting portions 1021, 1031 and colored reflecting portions 1023, 1033 are formed to have the same length; however, there may be included light expanding and reflecting portions and colored reflecting portions which are different in length.

Figure 12:
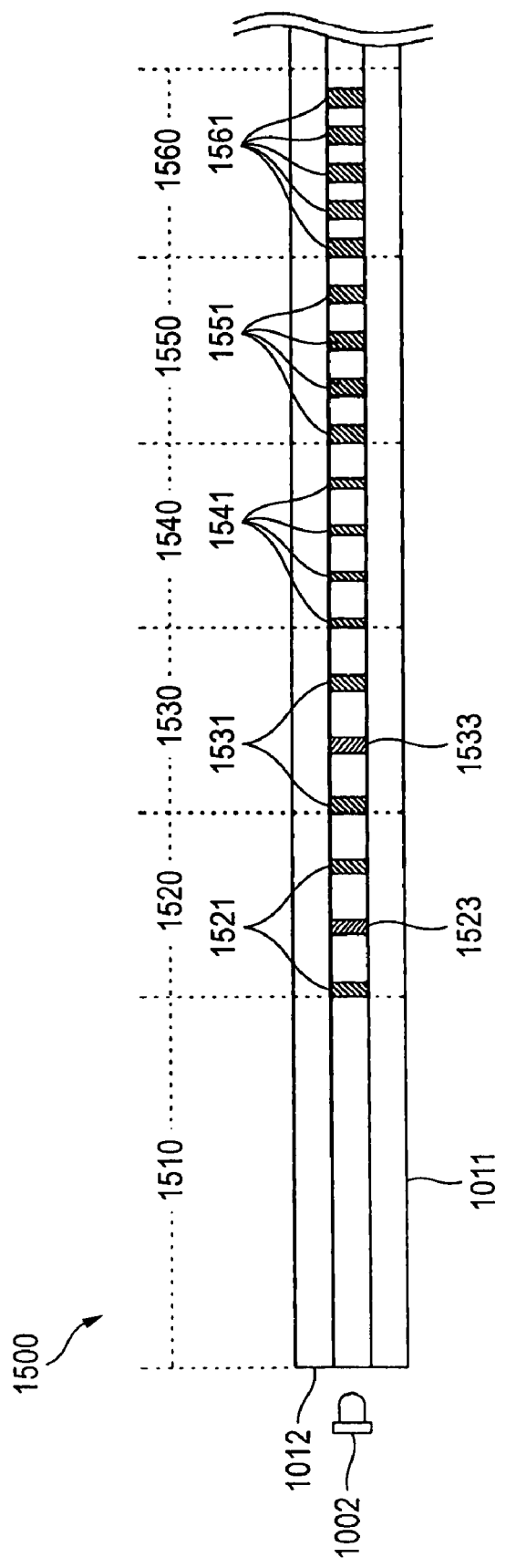
FIG. 12 is a view of the upper surface of a linear light guide member 1011 according to a modification of the fourth embodiment of the invention.

Now, FIG. 12 shows a modified embodiment which is different from the fourth embodiment in the length and arrangement of the light expanding and reflecting portion. As shown in FIG. 12, in the linear light guide member 1011, a portion thereof extending 10 cm from the end face 1012 disposed opposed to the white color LED light source 1002 is used as a first block 1510, and, after then, the linear light guide member 1011 is divided every 5 cm into a second block 1520, a third block 1530, a fourth block 1540, a fifth block 1550 and a sixth block 1560. In the first block 1510, there is formed neither light expanding and reflecting portion nor colored reflecting portion. In the upper surface 1014 of the second block 1520, there are formed, at intervals of about 12.4 mm, two white color light expanding and reflecting portions 1521 each having a length of about 4.3 mm and a yellow color colored reflecting portion 1523 having a length of about 4.3 mm. In the upper surface 1014 of the third block 1530, there are formed, at intervals of about 11.9 mm, two white color light expanding and reflecting portions 1531 each having a length of about 4.8 mm and a yellow color colored reflecting portion having a length of about 4.8 mm. In the upper surface 1014 of the fourth block 1540, there are formed, at intervals of about 9.5 mm, four white color light expanding and reflecting portions 1541 each having a length of about 3.0 mm. In the upper surface 1014 of the fifth block 1550, there are formed, at intervals of about 7.5 mm, four white color light expanding and reflecting portions 1521 each having a length of about 5.0 mm. In the upper surface 1014 of the sixth block 1560, there are formed, at intervals of about 5.2 mm, five white color light expanding and reflecting portions 1561 each having a length of about 4.8 mm. Even when these light expanding and reflecting portions 1521~1561 and colored reflecting portions 1523, 1533 are employed, there can be provided a similar effect to the above-mentioned light expanding and reflecting portions 1021~1041 and colored reflecting portions 1023, 1033.

Embodiment 5

Figure 13:
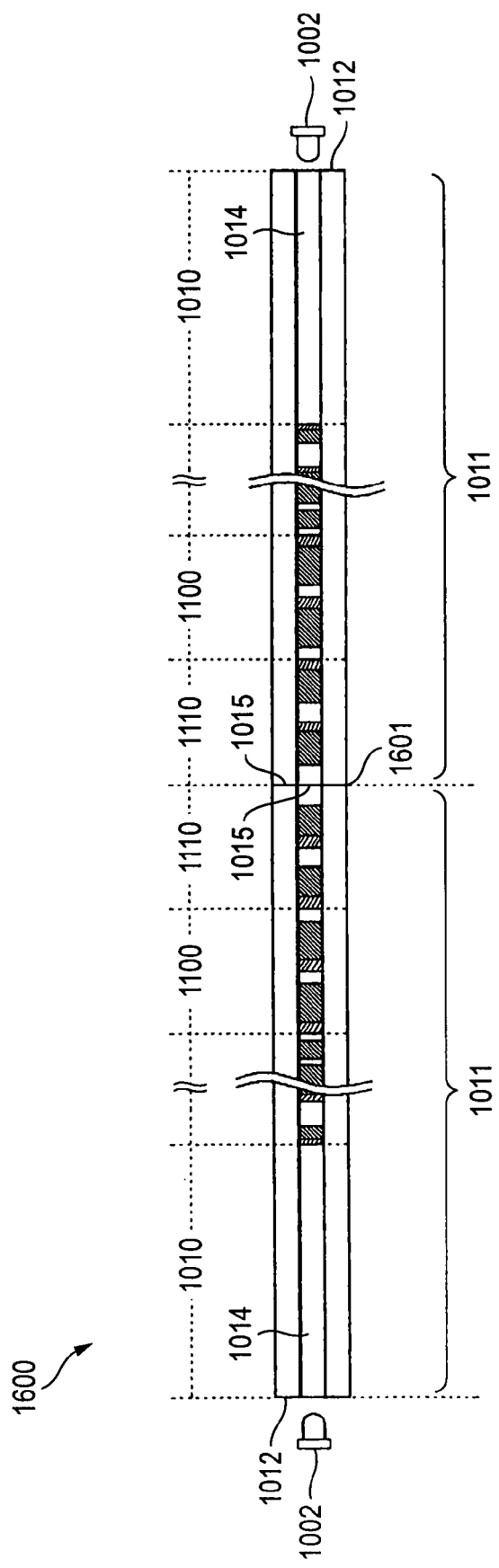
FIG. 13 is a view of the upper surfaces of two linear light guide members 1011 used in a linear light emitting apparatus 1600 according to a fifth embodiment of the invention.

Now, description will be given below of a linear light emitting apparatus 1600 according to a fifth embodiment of the invention. In this embodiment, the same parts thereof as those of the linear light emitting apparatus 1001 are given the same designations and the description thereof is omitted here. The linear light emitting apparatus 1600 includes two linear light guide members 1011. In FIG. 13, there are shown the upper surfaces of the two linear light guide members 1011. The two linear light guide members 1011 are disposed in such a manner that their respective longitudinal axes are on the same straight line. Further, the end faces 1015 of the two linear light guide members 1011 are connected together through a light reflecting layer 1601 in such a manner that a projecting portion 1013 is formed in a continuous manner.

In the linear light emitting apparatus 1600, since the two linear light guide members 1011 are connected together in the longitudinal axis direction thereof when they are used, it is possible to emit the linear light that is longer than in the first embodiment. In the vicinity of the connecting portion between the two linear light guide members 1011, the two kinds of light of the white color LED light sources 1012 are reflected into the linear light guide members 1011 by the light reflecting layer 1601, the amount of light in the vicinity of the connecting portion increases: however, in the tenth blocks 1100 and eleventh blocks 1110 which are respectively present near to their respective end faces 1015, the ratios of areas occupied by the light expanding and reflecting portions and colored reflecting portions decrease as they approach the end faces 1015. Therefore, the light expansion and reflection effects of the light expanding and reflecting portions and colored reflecting portions reduce as they approach the end faces 1015, whereby the excessive emission of the light can be prevented in the vicinity areas of the end faces 1015. As a result of this, the uneven amount of light emitted can be reduced.

Embodiment 6

Further, according to a sixth embodiment of the invention, the light may also be guided from the two ends of a single linear light guide member 1011. Here, FIG. 14 shows the lengths and arrangements of the light expanding and reflecting portions of a linear light emitting apparatus 1700 structured such that the light is guided from the two ends of the single linear light guide member 1011. To the end faces 1012 and 1015 of the linear light guide member 1011, there are opposed the light emitting sides of two light sources 1002. The linear light guide member 1011 is divided every about 10 cm from the end face 1012 into ten blocks: that is, a first block 1710, a second block 1720, a third block 1730, a fourth block 1740, a fifth block 1750, a sixth block 1760, a seventh block 1770, an eighth block 1780, a ninth block 1790 and a tenth block 1800. In the blocks existing in the first positions in the order starting from the two end faces 1012 and 1015, that is, in the first block 1710 and tenth block 1800, there is formed neither light expanding and reflecting portion nor colored reflecting portion. In each of the second block 1720 and ninth block 1790, there are formed, at intervals of about 8.7 mm, six reflecting portions each composed of a light expanding and reflecting portion 1721 or 1791 having a length of about 3.0 mm and a yellow color colored reflecting portion 1723 or 1793 having a length of about 5.0 mm. By the way, the yellow color colored reflecting portions 1723, 1793 are disposed on the side adjacent to the white color LED light sources 1002 in such a manner that they are nearer to their associated light sources than their associated light expanding and reflecting portions 1721, 1791. In each of the third and eighth blocks 1730 and 1780, there are formed, at intervals of about 7.2 mm, six light expanding and reflecting portions 1731, 1781 each having a length of about 9.5 mm. In each of the fourth and seventh blocks 1740 and 1770, there are formed, at intervals of about 5.7 mm, six light expanding and reflecting portions 1741, 1771 each having a length of about 11.0 mm. In each of the fifth and sixth blocks 1750 and 1760, there formed, at intervals of about 4.2 mm, six reflecting portions each composed of a light expanding and reflecting portion 1751 or 1761 each a length of about 8.5 mm and a blue color colored reflecting portion 1753 or 1763 each having a length of about 4.0 mm. By the way, the blue color colored reflecting portions 1753, 1763 are disposed on the side adjacent to the white color LED light sources 1002 in such a manner that they are nearer to their associated light sources than their associated light expanding and reflecting portions. According to such manner of formation, the sum of the areas of the light expanding and reflecting portions 1721~1791 and colored reflecting portions 1723~1793 are arranged closely step by step from the two ends 1012 and 1015 toward the center of the longitudinal axis of the linear light guide member 1011. Although the center of the linear light guide member 1011 in the longitudinal axis direction thereof tends to be small in the light amount, when the light expanding and reflecting portions 1721~1791 and colored reflecting portions 1723~1793 are arranged in this manner, the light expansion and reflection effects of the light expanding and reflecting portions and colored reflecting portions increase toward the center of the linear light guide member 1011, which makes it possible to reduce the uneven amount of light emitted.

A linear light emitting apparatus according to the invention can be used as a light source for various kinds of lighting or illumination.

What is claimed is:

1. A linear light emitting apparatus, comprising:
   a light source; and
   a linear light guide member into which the light of the light source is guided from one end side thereof,
   wherein the linear light guide member comprises:
      a protruding portion extending continuously along the longitudinal axis thereof; and
      light expanding and reflecting portions respectively formed in the upper surface of the protruding portion at given intervals, each of the light expanding and reflecting portions extending over the entire width of the upper surface of the protruding portion.

2. The linear light emitting apparatus as set forth in claim 1, wherein the protruding portion comprises the same width over the entire portion of the protruding portion, and
   wherein the section of the light emitting surface of the linear light guide member comprises a substantially circular-shaped curved surface.

3. The linear light emitting apparatus as set forth in claim 1, wherein, in the upper surface, an area except for the two end portions of the linear light guide member comprises a main expanding and reflecting area, and, in the main expansion and reflection area, the light expanding and reflecting portions are respectively disposed such that the densities thereof increase continuously or step by step as they part away from the light source.

4. The linear light emitting apparatus as set forth in claim 1, wherein the linear light guide member comprises a light reflecting layer on an end face thereof existing distant from the light source.

5. The linear light emitting apparatus as set forth in claim 1, wherein, in an end portion of the upper surface of the protruding portion distant from the light source, the light expanding and reflecting portions are respectively disposed such that the densities thereof decrease continuously or step by step as they part away from the light source.

6. The linear light emitting apparatus as set forth in claim 1, wherein, in an end portion of the upper surface of the protruding portion existing near to the light source, there are disposed none of the light expanding and reflecting portions.

7. The linear light emitting apparatus according to claim 1,
   wherein the light source emits light containing two or more light colors, and
   wherein the linear light guide member comprises colored reflecting portions of each which is colored in a desired color and which are formed on the upper surface.

8. The linear light emitting apparatus as set forth in claim 7, wherein each of the colored reflecting portions is colored in the complementary color of a color to be absorbed;
   the colored reflecting portions are arranged in the vicinity of the light source of the linear light guide member such that the densities thereof are high; and
   the light expanding and reflecting portions are arranged such that the densities thereof increase continuously or step by step as they become distant from the light source of the linear light guide member.

9. The linear light emitting apparatus as set forth in claim 7, wherein each of the colored reflecting portions is colored in a color to be absorbed; and
   the light expanding and reflecting portions as well as the colored reflecting portions are arranged such that the densities thereof increase continuously or step by step as they become distant from the light source of the linear light guide member.

10. The linear light emitting apparatus as set forth in claim 1, wherein the light expanding and reflecting portions comprise a reflective tape.

11. The linear light emitting apparatus as set forth in claim 1, wherein the upper surface of the protruding portion comprises an outer surface which is substantially uniform in an axial direction of the light guide member.

12. The linear light emitting apparatus as set forth in claim 1, wherein the light expanding and reflecting portions comprise a length in an axial direction of the light guide and are disposed along a length of the light guide in an axial direction such that the emitted light is substantially uniform along the light guide.

13. The linear light emitting apparatus as set forth in claim 1, wherein the light expanding and reflecting portions comprise painted portions.

14. The linear light emitting apparatus as set forth in claim 1, wherein the light source comprises multiple light-emitting diode (LED) lamps.

15. The linear light emitting apparatus as set forth in claim 1, wherein the upper surface of the protruding portion comprises a substantially planar outer surface.

16. The linear light emitting apparatus as set forth in claim 1, wherein the upper surface of the protruding portion comprises a substantially curved surface.

17. The linear light emitting apparatus as set forth in claim 1, wherein the upper surface of the protruding portion comprises a plurality of colored reflecting portions.

18. The linear light emitting apparatus as set forth in claim 1, wherein the light source comprises a colored light.

19. A linear light emitting apparatus, comprising:
a first light source;
a second light source;
a first linear light guide member into which the light of the first light source is guided from one end side thereof, the first linear light guide member including a protruding portion extending continuously along the a longitudinal axis of the first linear light guide member as well as first light expanding and reflecting portions respectively formed on an upper surface of the protruding portion at given intervals, each of the first light expanding and reflecting portions extending over an entire width of the upper surface of the protruding portion; and
a second linear light guide member into which the light of the second light source is guided from one end side thereof, the second linear light guide member including a protruding portion extending continuously along a longitudinal axis of the second linear light guide member as well as second light expanding and reflecting portions respectively formed on the an upper surface of its associated protruding portion at given intervals, each of the second light expanding and reflecting portions extending over an entire width of the upper surface of its associated protruding portion,
wherein an end face of the first linear light guide member disposed distant from the first light source is connected to an end face of the second linear light guide member disposed distant from the second light source.

20. The linear light emitting apparatus as set forth in claim 19, wherein the end face of the first linear light guide member disposed distant from the first light source abuts the end face of the second linear light guide member disposed distant from the second light source.

21. The linear light emitting apparatus as set forth in claim 19, wherein the end face of the first linear light guide member disposed distant from the first light source and the end face of the second linear light guide member disposed distant from the second light source comprise a reflecting layer.

22. A linear light emitting apparatus, comprising:
a first light source;
a second light source disposed opposed to the first light source; and
a linear light guide member which is interposed between the first and second light sources and into which a light of the first light source is guided from one end side thereof and a light of the second light source is guided from an other end side thereof, the linear light guide member comprising a protruding portion extending continuously along a longitudinal axis thereof as well as light expanding and reflecting portions respectively formed on the upper surface of the protruding portion, each of the light expanding and reflecting portions extending over an entire width of the upper surface, the light expanding and reflecting portions being respectively formed such that the densities thereof increase as they approach a center of the linear light guide member from the two end faces of the linear light guide member.

23. The linear light emitting apparatus as set forth in claim 22, wherein the upper surface of the protruding portion comprises an outer surface which is substantially uniform in an axial direction of the light guide member.

\* \* \* \* \*